(12) United States Patent
Yang et al.

(10) Patent No.: US 9,200,894 B2
(45) Date of Patent: Dec. 1, 2015

(54) FILM AND LIGHT GUIDE HAVING MATERIAL WHICH CAN PROVIDE POSITION INFORMATION AND DISTRIBUTED THEREON ON, AND POSITION DETECTING SYSTEM UTILIZING THE FILM OR THE LIGHT GUIDE

(71) Applicant: PixArt Imaging Inc., Hsin-Chu (TW)

(72) Inventors: Shu-Sian Yang, Hsin-Chu (TW); Han-Ping Cheng, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 355 days.

(21) Appl. No.: 13/771,098

(22) Filed: Feb. 20, 2013

(65) Prior Publication Data

US 2014/0027608 A1    Jan. 30, 2014

(30) Foreign Application Priority Data

Jul. 25, 2012 (TW) .............................. 101126743 A

(51) Int. Cl.
*G01B 11/14* (2006.01)
*G06F 3/03* (2006.01)
*G06F 3/0354* (2013.01)

(52) U.S. Cl.
CPC .............. *G01B 11/14* (2013.01); *G06F 3/0321* (2013.01); *G06F 3/03542* (2013.01)

(58) Field of Classification Search
CPC combination set(s) only.
See application file for complete search history.

(56) References Cited

U.S. PATENT DOCUMENTS

| 2007/0075648 A1* | 4/2007 | Blythe et al. ................... 315/149 |
| 2008/0074401 A1* | 3/2008 | Chung et al. ................... 345/175 |
| 2012/0056853 A1* | 3/2012 | Iwamoto ....................... 345/175 |

FOREIGN PATENT DOCUMENTS

| JP | 201139958 | 2/2011 |
| TW | 201030580 | 8/2010 |
| TW | M419988 | 1/2012 |
| WO | 2009127909 A2 | 10/2009 |

* cited by examiner

*Primary Examiner* — Francis M Legasse, Jr.
(74) *Attorney, Agent, or Firm* — Winston Hsu; Scott Margo

(57) ABSTRACT

A position detecting system with a position information providing apparatus, a transceiver, and a processor. The position information providing apparatus comprises a light emitting-out side having at least one position information region distributed on an outer surface of the light emitting-out side. The position information region comprises materials which are distributed on the outer surface and provide the position information. The light has position information from the position information region when the light emits out from at least part of the light emitting-out side. The transceiver receives the light with the position information. The processor determines a relative position between the transceiver and the position information providing apparatus according to the position information received by the transceiver.

25 Claims, 4 Drawing Sheets

FILM AND LIGHT GUIDE HAVING MATERIAL WHICH CAN PROVIDE POSITION INFORMATION AND DISTRIBUTED THEREON ON, AND POSITION DETECTING SYSTEM UTILIZING THE FILM OR THE LIGHT GUIDE

BACKGROUND OF THE INVENTION

1. Field of the Invention

The present invention relates to a film and a light guide, and a position detecting system utilizing the film or the light guide. The present invention particularly relates to a film and a light guide having position information, and a position detecting system utilizing the film or the light guide.

2. Description of the Prior Art

A touch control panel, a hand drawing board, or a digital pen such as an OID (Object identifier) is always utilized to perform writing function of an electronic apparatus.

However, above-mentioned apparatuses may have defects hard to be overcome. For example, a user may put his hand on the touch control panel whiling using it, such that the touch control panel will wrongly determine that the user performs a touch control operation to it and a wrong action may be correspondingly performed. Neither capacitor type touch control panel, resistor type touch control panel nor optical type touch control panel can avoid such issue. An electromagnet type touch control panel may suppress this kind of issue. However, such system is expensive since both the touch control panel itself and the touch control pen utilized to input command to the touch control panel need electromagnet devices. Also, the digital pen is an apparatus that is hard to be applied to a normal screen, since a light source on the digital pen is needed and the object that the digital pen is applied to needs micro codes printed thereon, via printing ink or other materials, to receive light transmitted to a surface of the object.

SUMMARY OF THE INVENTION

Therefore, one objective of the present invention is to provide a position detecting system that can utilize an outer light source, such that no extra light source is needed on the transceiver such as a digital pen.

Another objective is to provide a light guide with position information, such that the light guide can be applied to various kinds of displays.

Another objective is to provide a film with position information, such that it can be applied for various kinds of light emitting apparatuses or light sources.

One embodiment of the present invention provides a position detecting system, which comprises: a position information providing apparatus, comprising a light emitting-out side, having at least one position information region distributed on an outer surface of the light emitting-out side, wherein light has position information from the position information region when the light emits out from at least part of the light emitting-out side; a transceiver, for receiving the light with the position information; and a processor, for determining a relative position between the transceiver and the position information providing apparatus according to the position information received by the transceiver.

The above-mentioned position detecting system can comprise a light guide that can provide position information, which comprises: a light receiving side, to receive light from a light source; and a light emitting-out side, having at least one position information region distributed on an outer surface of the light emitting-out side, wherein the light has position information from the position information region when the light emits out from at least part of the light emitting-out side.

The above mentioned can comprise a film that can provide position information, which comprises: a light receiving side, to receive light from a light source; and a light emitting-out side, having at least one position information region distributed on an outer surface of the light emitting-out side, wherein the light has position information from the position information region when the light emits out from at least part of the light emitting-out side.

Please note the above-mentioned and the film are not limited to the position detecting system, but also can be utilized for other electronic apparatuses.

In view of above-mentioned embodiments, the light L emits out the light emitting-out side 107 to bring position information, thus the transceiver can have no light source, such that lower consumption is possible. Additionally, the present invention utilizes a light guide or a film to provide position information, such that the light guide or the film can be combined with the conventional displays or projection apparatuses. By this way, the present invention can be utilized for various kinds of applications.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

Figure 1:
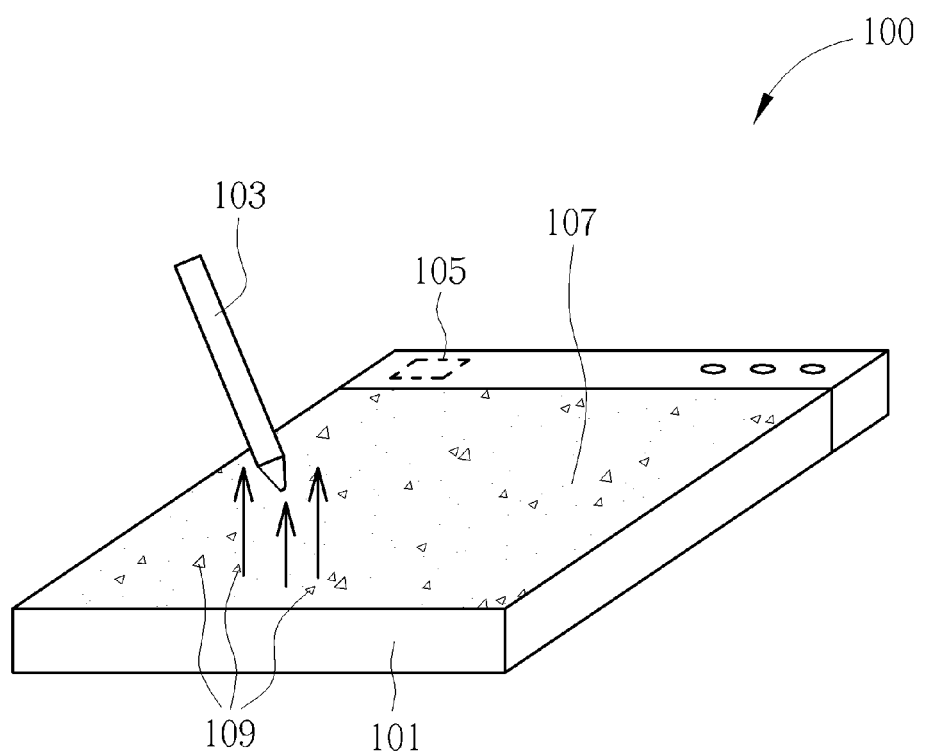
FIG. 1 illustrates a position detecting system according to one embodiment of the present invention.

FIG. 1 illustrates a position detecting system 100 according to one embodiment of the present invention. As shown in FIG. 1, the position detecting system 100 includes a position information providing apparatus 101, a transceiver 103 and a processor 105. The position information providing apparatus 101 includes a light emitting-out side 107, which has at least one position information region 109 (only part of them are illustrated) distributed on an outer surface of the light emitting-out side 107. The light L has position information from the position information region 109 when the light L emits out from at least part of the light emitting-out side 107. The transceiver 103 (ex. a digital pen) receives the light L with position information to receive related images. The processor 105 determines a relative position between the transceiver 103 and the position information providing apparatus 101 according to the position information received by the transceiver 103.

In one embodiment, the position information region 109 stops the light passing through the position information region 109, such that lower luminance is generated. In another embodiment, the position information region 109 makes part of the light spread such that higher luminance is generated. Therefore, the position information region 109 can change luminance that the light emitting-out side 107 presents. The position information region 109 can include ink, light absorbing materials, or laser materials, and can be visible materials or invisible materials. In another embodiment, the position information region 109 comprises a wavelength converting material to stop light with a specific wavelength. Therefore, the light L can be invisible light with a specific wavelength, such as infrared light, such that the light L can be stopped by the position information region 109 and will not affect a user's vision.

The position information region 109 can include different distribution densities, sizes, materials, and shapes (i.e. the shape that the position information region 109 forms). The transceiver 103 transmits the image formed by the light L to the processor 105 after receives the image. The processor 105 compares the images with pres-stored data, to compute the luminance and above-mentioned parameters such as distribution densities, sizes, materials, and shapes, thereby a relative position between the transceiver 103 and the position information providing apparatus 101 can be acquired. Accordingly, the transceiver 103 can be encoded points or figures with position information. Different micro code algorithms can be applied to the encoding, such as above-mentioned OID technique, but it is not limited.

Figure 2:
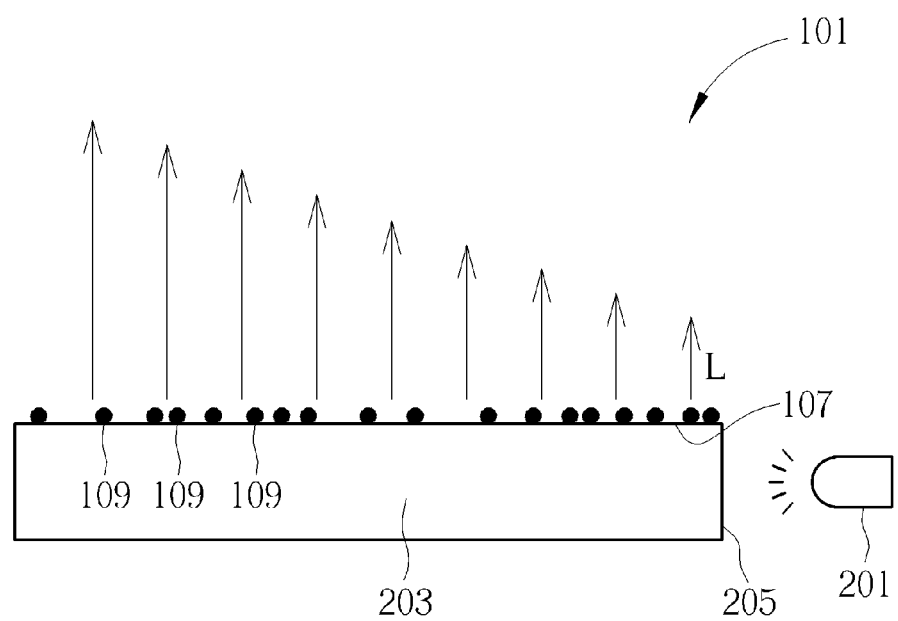
FIG. 2 is a schematic diagram illustrating the structures for the position providing apparatus shown in FIG. 1.

FIG. 2 is a schematic diagram illustrating the structures for the position information providing apparatus 101 shown in FIG. 1. As shown in FIG. 2, the position information providing apparatus 101 comprises a light source 201 and a light guide 203. The light guide 203 comprises the light emitting-out side 107, and a light receiving side 205 to receive the light from the light source 201. The position information region 109 is distributed on an outer surface of the light emitting-out side 107. A conventional light guide has a characteristic that the light does not emit out the light guide and fully reflects in the light guide after emits into the light guide. However, the light can emit out from the light guide and is not limit to fully reflect inside the light guide 203 via providing above-mentioned position information region 109 on the light emitting-out side 107 of the light guide 203.

Figure 3:
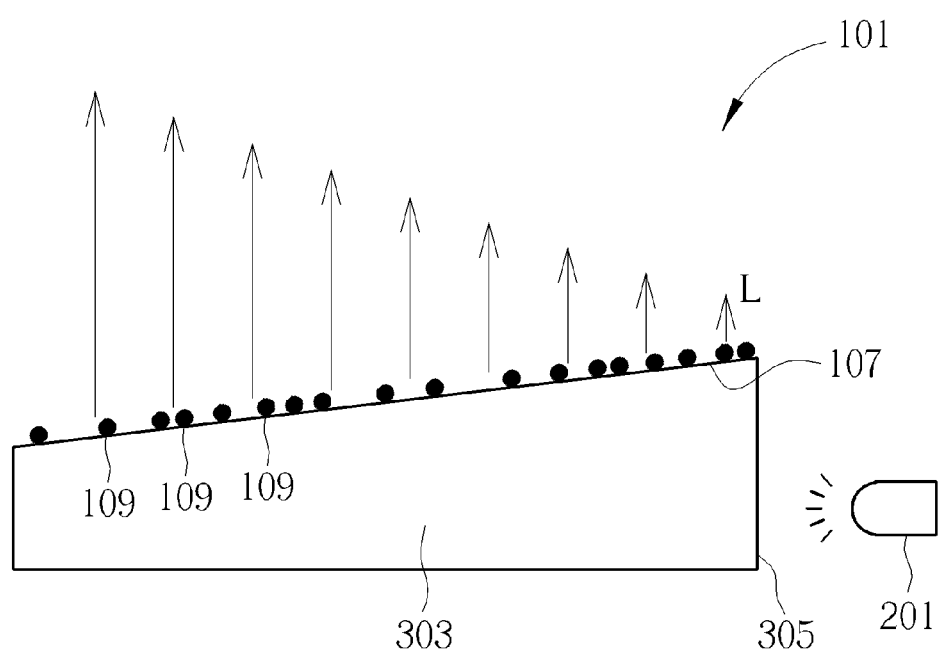
FIG. 3 is an extended embodiment for the embodiment shown in FIG. 2.

In the embodiment shown in FIG. 2, the light receiving side 205 is orthogonal to the light emitting-out side 107 since the light guide 203 is rectangular. However, the light guide can also have other shapes. FIG. 3 is an extended embodiment for the embodiment shown in FIG. 2, in which the position providing apparatus 101 also includes a light source 201 and a light guide 303. Similar with FIG. 1, the light guide 303 also includes the light emitting-out side 107, and a light receiving side 305 to receive the light from the light source 201. The position information region 109 is provided on the light emitting-out side 107 as well. One difference between the embodiments shown in FIG. 2 and FIG. 3 is the light guide 203 in FIG. 2 is a rectangle, but the light guide 303 in FIG. 3 is a wedge. Thus the light emitting-out side 107 and the light receiving side 305 are not orthogonal to each other. Modern electronic apparatus is not limited in a rectangular shape since it maybe designed for fitting ergonomics. Therefore, the light transmitting path and luminance can be well controlled via providing light guides in different shapes, such that the present invention can be utilized for various kinds of application.

Figure 4:
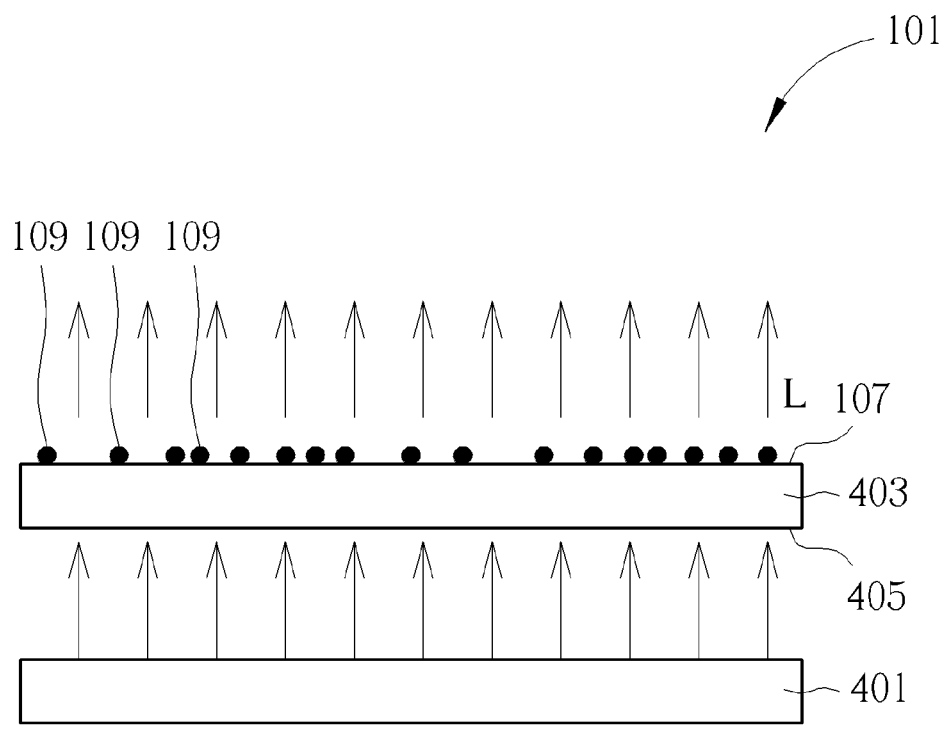
FIG. 4 is a schematic diagram illustrating another example for the structures of the position detecting system shown in FIG. 1.

FIG. 4 is a schematic diagram illustrating another example for the structures for the position detecting system 101 shown in FIG. 1. As shown in FIG. 4, the position information providing apparatus 101 includes a light emitting apparatus 401 such as a LCD or a lamp, and a film 403. The light emitting apparatus 401 is utilized to provide light. The film 403 is on the light emitting apparatus 401 and includes the light emitting-out side 107, and a light receiving side 405 to receive the light from the light receiving side 405. The light emitting-out side 107 is opposite to the light receiving side 405. The light emitting-out side 107 in FIG. 4 also includes position information region provided thereon, thus light L with position information is generated after the light emits from the light emitting apparatus 401 and passes through the film 107.

Please note the light guide shown in FIG. 2 and FIG. 3, and the film shown in FIG. 4, are not limited to the position detecting system shown in FIG. 1, but also can be utilized for other electronic apparatuses.

In view of above-mentioned embodiments, the light L emits out the light emitting-out side 107 to bring position information, thus the transceiver can have no light source, such that lower consumption is possible. Additionally, the present invention utilizes a light guide or a film to provide position information, such that the light guide or the film can be combined with the conventional displays or projection apparatuses. By this way, the present invention can be utilized for various kinds of applications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light guide that can provide position information, comprising:
    a light receiving side, to receive light from a light source; and
    a light emitting-out side, having at least one position information region distributed on an outer surface of the light emitting-out side, wherein the light has position information from the position information region when the light emits out from at least part of the light emitting-out side;
    wherein the position information region comprises materials which are distributed on the outer surface and provide the position information.

2. The light guide of claim 1, wherein the position information region stops all the light passing through the position information region.

3. The light guide of claim 1, wherein the position information region makes part of the light spread.

4. The light guide of claim 1, wherein the light is invisible light with a specific wavelength.

5. The light guide of claim 4, wherein the position information region comprises a wavelength converting material to stop light with the specific wavelength.

6. The light guide of claim 1, wherein the position information can be determined by at least following characteristic of the position information region: distribution density, size, materials and shape.

7. The light guide of claim 1, wherein the position information region changes luminance that the light emitting-out side presents.

8. The light guide of claim 1, wherein the light receiving side is orthogonal to the light emitting-out side.

9. A film that can provide position information, comprising:
- a light receiving side, to receive light from a light source; and
- a light emitting-out side, having at least one position information region distributed on an outer surface of the light emitting-out side, wherein the light has position information from the position information region when the light emits out from at least part of the light emitting-out side;
- wherein the position information region comprises materials which are distributed on the outer surface and provide the position information.

10. The film of claim 9, wherein the position information region stops all the light passing through the position information region.

11. The film of claim 9, wherein the position information region makes part of the light spread.

12. The film of claim 9, wherein the light is invisible light with a specific wavelength.

13. The film of claim 12, wherein the position information region comprises a wavelength converting material to stop light with the specific wavelength.

14. The film of claim 9, wherein the position information can be determined by at least following characteristic of the position information region: distribution density, size, materials and shape.

15. The film of claim 9, wherein the position information region changes luminance that the light emitting-out side presents.

16. A position detecting system, comprising:
- a position information providing apparatus, comprising a light emitting-out side, having at least one position information region distributed on an outer surface of the light emitting-out side, wherein light has position information from the position information region when the light emits out from at least part of the light emitting-out side, wherein the position information region comprises materials which are distributed on the outer surface and provide the position information;
- a transceiver, for receiving the light with the position information; and
- a processor, for determining a relative position between the transceiver and the position information providing apparatus according to the position information received by the transceiver.

17. The position detecting system of claim 16, wherein the position detecting system comprises:
- a light source; and
- a light guide, comprising the light emitting-out side, and a light receiving side to receive the light from the light source.

18. The position detecting system of claim 17, wherein the light receiving side is orthogonal to the light emitting-out side.

19. The position detecting system of claim 16, wherein the position information providing apparatus comprises:
- a light emitting apparatus, for providing the light; and
- a film, on the light emitting apparatus, comprising the light emitting-out side, and a light receiving side to receive the light from the light emitting apparatus.

20. The position detecting system of claim 16, wherein the position information region stops all the light passing through the position information region.

21. The position detecting system of claim 16, wherein the position information region makes part of the light spread.

22. The position detecting system of claim 16, wherein the light is invisible light with a specific wavelength.

23. The position detecting system of claim 22, wherein the position information region comprises a wavelength converting material to stop light with the specific wavelength.

24. The position detecting system of claim 16, wherein the position information can be determined by at least following characteristic of the position information region: distribution density, size, materials and shape.

25. The position detecting system of claim 16, wherein the position information region changes luminance that the light emitting-out side presents.

* * * * *